Figure 1:
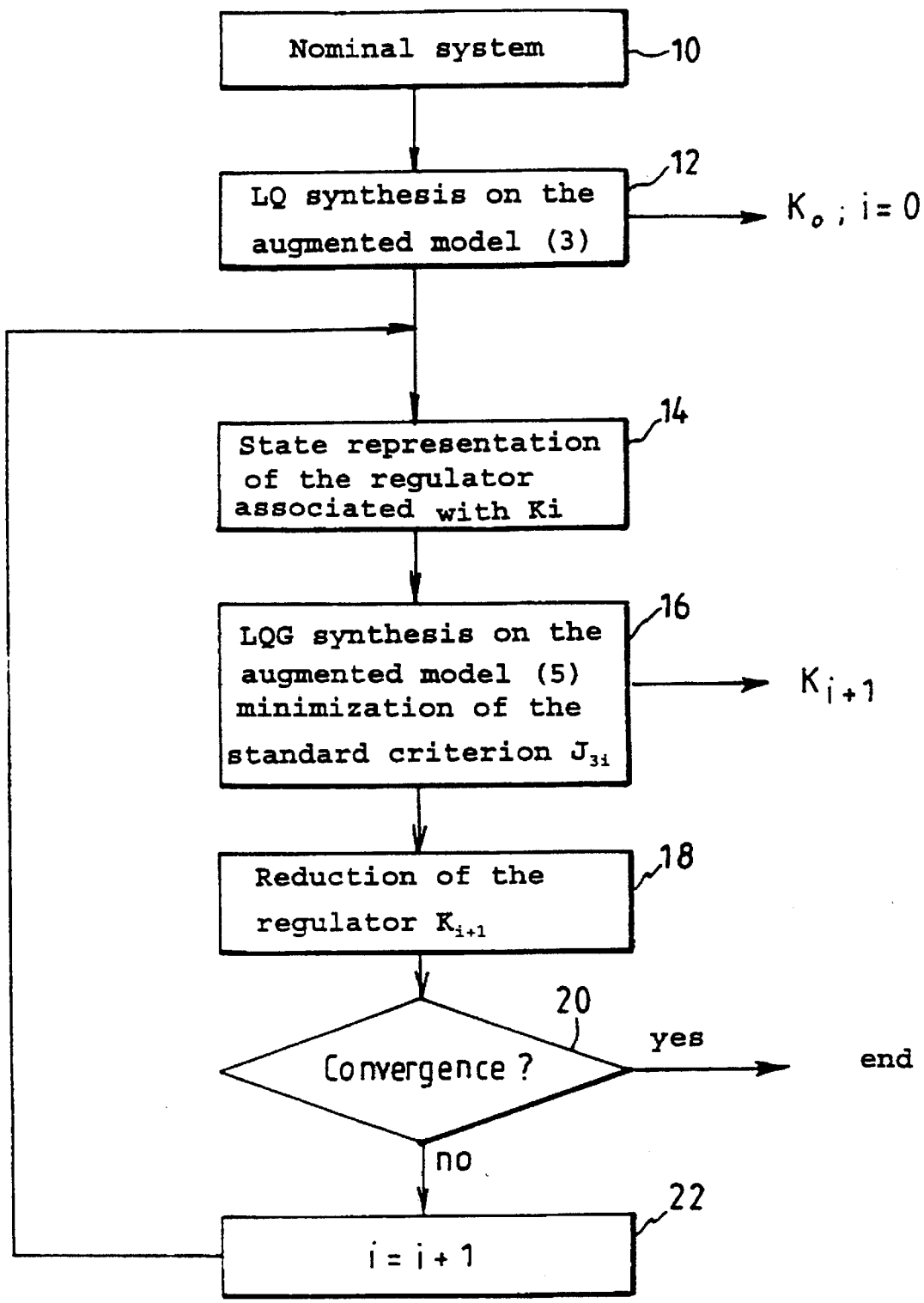

United States Patent [19]
Bourlès et al.

[11] Patent Number: 5,606,248
[45] Date of Patent: Feb. 25, 1997

[54] DEVICE FOR DESENSITIZED REGULATION OF THE STATOR VOLTAGE OF AN ALTERNATOR

[75] Inventors: Henri Bourlès, Vanves; Annissa Heniche; Marie-Pierre Houry, both of Paris, all of France

[73] Assignee: Electricite De France - Service National, Paris, France

[21] Appl. No.: 564,019

[22] Filed: Nov. 29, 1995

[30] Foreign Application Priority Data

Nov. 30, 1994 [FR] France .................. 94 14 400

[51] Int. Cl.$^6$ .................. H02K 9/10; G05B 13/02
[52] U.S. Cl. .................. 323/273
[58] Field of Search .................. 323/273–274, 323/280–281, 284, 289, 351, 313, 299

[56] References Cited

U.S. PATENT DOCUMENTS

| | | | |
|---|---|---|---|
| 5,373,227 | 12/1994 | Keeth .................. | 323/313 |
| 5,548,205 | 8/1996 | Monticelli .................. | 323/274 |

FOREIGN PATENT DOCUMENTS

| | | |
|---|---|---|
| 66651 | 12/1982 | European Pat. Off. . |
| 377327 | 7/1990 | European Pat. Off. . |

OTHER PUBLICATIONS

European Transactions on Electrical Power Engineering, vol. 3, No. 6, Nov. 1993, pp. 443–451, D. P. Papadopoulos et al "Robust Excitation Controller for Synchronous Generators Using Output Feedback".

IEEE Transactions on Energy Conversion, vol. 5, No. 4, Dec. 1990, New York, USA, pp. 673–678, Chengxiong Mao et al "An Adaptive Generator Excitation Controller Based on Linear Optimal Control".

IEE Proceedings–D, vol. 138, No. 4, Jul. 1991, Stevenage, Herts, G. B., P. Wozniak et al "Feedback Stabilization of Synchronous Generator by Extended Linearisation".

*Primary Examiner*—Aditya Krishnan
*Attorney, Agent, or Firm*—Sughrue, Mion, Zinn, Macpeak & Seas

[57] ABSTRACT

The invention relates to a device for regulating the stator voltage of an alternator, which includes several feedback loops (52, 54, 56, 66) each associated with a gain ($K_\Omega$, $K_V$, $K_P$, $K_I$) acting on state variables ($\Omega$, $V_S$, P) measured at the output of the system as well as on the integral of the setpoint error. The gains ($K_\Omega$, $K_V$, $K_P$, $K_I$) are obtained by minimizing the mathematical expectation of a quadratic criterion which is dependent upon a state vector, upon the control variable (u) as well as upon the sensitivities of these variables, when the alternator operating parameters vary about its normal operating point.

6 Claims, 2 Drawing Sheets

DEVICE FOR DESENSITIZED REGULATION OF THE STATOR VOLTAGE OF AN ALTERNATOR

The present invention relates to a device for regulating the stator voltage of an alternator coupled to an electrical network, this device resulting from a linear approximation of the alternator coupled to the electrical network around a nominal operating point defined by several operating parameters of the alternator and including several feedback loops associated with respective gains acting on several state variables measured at the output of the alternator as well as on the integral of a setpoint error defined by the difference between the stator voltage and a setpoint value, in order to define, on the basis of the setpoint value, a control variable for the alternator, which is applied to the input out of the latter to maintain the value of the stator voltage close to the setpoint value.

The invention applies in particular to the turbo-alternator sets coupled to an electrical network and equipped with an independent speed regulator. In such regulation, the objective is to act on the excitation voltage of the alternator so as to ensure, irrespective of the operating point at which the machine lies, the stability of the alternator, also termed the system in the remainder of the description, the maintaining of the stator voltage at a value near to the setpoint voltage, and finally satisfactory performance in the case of a short-circuit setpoint voltage step, a load transfer or a variation in frequency of the network.

The difficulty related to the design of voltage regulators is that they have to provide a solution to disturbances of very different kinds, the solutions provided to these various problems sometimes having conflicting effects.

Various methods of designing voltage regulators are currently known, such as for example the method of pole placement, optimal linear quadratic control or again so-called H-infinity synthesis. However, these various methods are not fully satisfactory since the regulators obtained offer rather poor parametric robustness, that is to say they are very sensitive to the errors in the values of the modelling parameters or to their variations.

The aim of the present invention is therefore to provide a voltage regulating device making it possible to meet the stability demands irrespective of the operating point of the system, and which is moreover robust with regard to parametric uncertainties due to modelling and to modifications of the topology of the electrical network.

For this purpose, the subject of the present invention is a device for regulating the stator voltage of an alternator coupled to an electrical network, this device resulting from a linear approximation of the alternator coupled to the electrical network around a nominal operating point defined by several operating parameters of the alternator and including several feedback loops associated with respective gains acting on several state variables measured at the output of the alternator as well as on the integral of a setpoint error defined by the difference between the stator voltage and a setpoint value, in order to define, on the basis of the setpoint value, a control variable for the alternator, which is applied to the input of the latter to maintain the value of the stator voltage close to the setpoint value, characterized in that the gains of the device are obtained by minimizing the mathematical expectation of a quadratic criterion dependent upon a state vector embracing the derivatives with respect to time of the state variables of the alternator and the setpoint error and upon the derivative with respect to time of the control variable, these variables being respectively the state and the input of a linear model, termed the augmented system, whose state matrix and input matrix depend on several of the parameters of the alternator, and in that the gains are determined so as furthermore to minimize the sensitivities of the state vector and of the derivative with respect to time of the control variable relative to small variations in at least one of the said several parameters of the alternator around the nominal operating point thus creating a desensitization of the regulated alternator with regard to the said several parameters.

The regulating device can also include one or more of the following characteristics:

the said quadratic criterion is dependent upon the partial derivatives of the state vector and upon the derivative with respect to time of the control variable with respect to the parameters of the alternator, and the desensitization of the regulated alternator is carried out by minimization of the said quadratic criterion;

the linear model giving rise to the state variables used in the state vector is a model reduced to a lower order of a complete linear model by a method of balanced feasibility consisting in minimizing a norm of the difference between the transfer matrix of the complete model and that of the reduced model;

the gains are determined by an iterative method consisting in carrying out at each step a synthesis of the gains by a method of linear quadratic Gaussian control, consisting in minimizing a quadratic criterion, applied to an augmented model dependent upon a state representation of the regulating device obtained with the gains calculated in the previous step and upon the linear modelling of the augmented system;

each step of synthesizing the gains is followed by a reduction to a lower order of the state representation associated with these gains by a method of balanced feasibility;

the state variables are the angular speed, the stator voltage and the electrical power.

Figure 2:
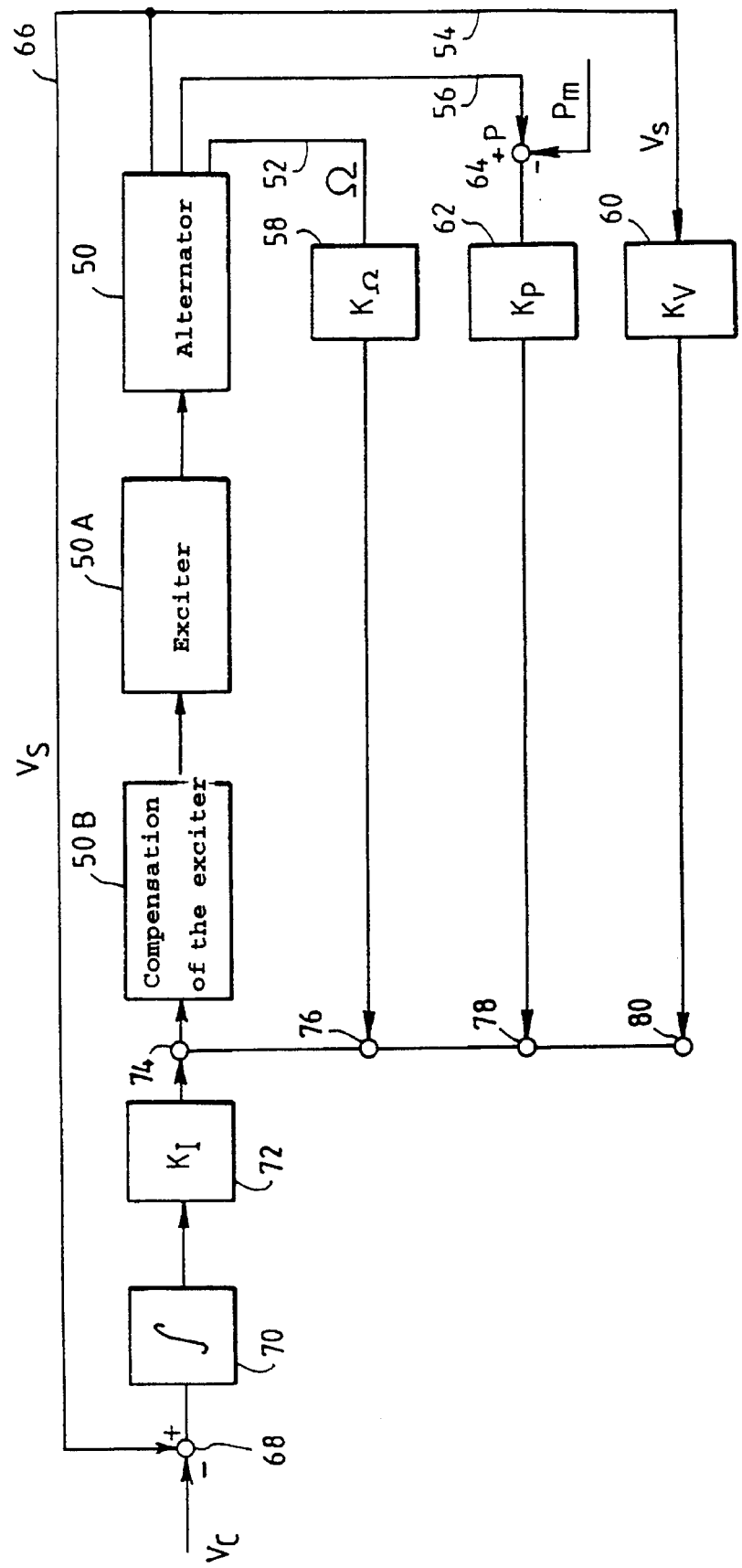

The present invention will be better understood on reading the following description, given merely by way of example and provided with reference to the drawings in which:

FIG. 1 is a flowchart of an iterative procedure implemented for the determination of the gains of the regulating device, and FIG. 2 is a block diagram of a regulated alternator using a regulating device according to the invention.

In the description which follows, the alternator is modelled or approximated by the known model of an alternator connected to an infinite network. In this case, the parameters of this system are fully determined on the basis of the operating point defined by the active power P, the reactive power Q, the stator voltage $V_S$ and the length of the line X.

Thus, in this modelling, the set of admissible operating points can be defined on the basis of these four quantities, the variations in these quantities corresponding to the parametric variations of the system.

The model defined above makes it possible to determine gains denoted $K_\Omega$, $K_V$, $K_P$ and $K_X$ of the regulating device, which are used in feedback loops in combination with state variables measured at the output of the alternator so as to define, on the basis of a setpoint value $V_C$, a control variable u for the alternator, as is represented in FIG. 2 and will be described in more detail in the remainder of the description.

In order to obtain a linear model which is as reliable as possible, a non-linear complete model of order five is firstly obtained in a classical manner from the equations governing the operation of the alternator connected to the infinite network.

This model is linearized around a nominal operating point so as to determine a complete linear model of order five, which, for small variations, can be expressed by the following state representation:

$$x_5 = A_5 x_5 + B_5 u \qquad (0)$$

$$y = C_5 x_5$$

The physical significance of the state variables in this model is of no interest in the remainder of the description, so it will not be detailed here. Moreover, these state variables are not measurable.

When determining the gains $K_\Omega$, $K_V$, $K_P$ and $K_I$ of the regulating device, the use of measurable state variables such as the angular speed $\Omega$, the stator voltage $V_S$ and the electrical power P is preferred. It is on these state variables that the gains act in the regulating device.

To do this, the previous model is reduced to a linear model of order three, according to the classical method of balanced feasibility.

This method consists in minimizing, within the Hardy space, a norm denoted H-infinity, of the difference between the transfer matrix of the complete linear model and that of the reduced model.

Reduction of the linear model of order five to a model of order three and a change of basis, a classical operation within this context, make it possible to express the linear model of order three of the alternator connected to the infinite network at the chosen operating point in the following form:

$$x_3 = A_3 x_3 + B_3 u \qquad (1)$$

$$y = x_3 \text{ with } x_3 i = [\Omega V_S P].$$

As is known in the state of the art, in order to maintain the value of the output variable to be regulated, assumed here to be the stator voltage denoted $V_S$, equal to the setpoint value denoted $V_C$, it is desirable for the alternator control variable u, generated by the regulating device, to have an integral effect.

To do this, and in a classical manner, an augmentation of the model (1) is carried out by incorporating into a so-called "augmented" model a setpoint error denoted e equal to the difference between the stator voltage $V_S$ and the value of the setpoint $V_C$. This augmented model is then of the form:

$$x = A\ x + B u_f \qquad (2)$$

$$y = x$$

where $$x = \begin{bmatrix} x_3 \\ e \end{bmatrix}; e = V_S - V_C; A = \begin{bmatrix} A_3 & 0 \\ [0\ 1\ 0] & 0 \end{bmatrix}; B = \begin{bmatrix} B_3 \\ 0 \end{bmatrix}; u_f = \dot{u}$$

In this model, the variable $u_f$ is the derivative with respect to time of the control variable u applied by the regulating device to the control input of the alternator. The vector x is a system state vector and it embraces the state variables measured at the output of the alternator, as well as the setpoint error e. This state vector x is then said to be augmented.

Given the design of the regulating device according to the invention as shown diagrammatically in FIG. 2, this variable $u_f$ is of the form;

$$u_f = -K_\Omega \Omega - K_v V_s - K_P P - K_X (V_S - V_C)$$

To obtain the control variable u, it suffices to integrate the variable $u_f$ with respect to time in the expression for the control law above.

According to the present invention, the gains $K_\Omega$, $K_V$, $K_P$ and $K_I$ are determined so as to minimize the mathematical expectation of the energy associated with the augmented state vector x and with the variable $u_f$ for uncertain values of the operating parameters of the system, which are near their nominal value. In the modelling, the operating parameters of the system are grouped together in the form of a parameter vector denoted $\theta = (P, V_S, Q, X)$.

To do this, the augmented model (2) is considered, in which the state matrix $A(\theta)$ and input matrix $B(\theta)$ depend upon the various parameters $\theta = (P, V_S, Q, X)$ of the system. This augmented model, termed the augmented system, can then be written in the following form:

$$x(t) = A(\theta)x(t) + B(\theta)u_f(t) \qquad (3)$$

$$y(t) = x(t)$$

$$x(O) = x_0.$$

When determining the gains $K_Q$, $K_V$, $K_P$ and $K_X$ of the regulating device, it will be assumed in this modelling that the parameters $\theta = (P, V_S, Q, X)$ of the system are time-invariant and independent in the probabilistic sense of the initial state $x_0$.

On the basis of this modelling (3), a quadratic criterion $J_1$ is then defined by the following relation:

$$J_1 = \lim_{T \to \infty} \frac{1}{T} \int_0^T E[x^T(t,\theta) Q_c x(t,\theta) + u_f^T(t,\theta) R_c u_f(t,\theta)] dt$$

in which E denotes the mathematical expectation, $Q_C$ is a symmetric, positive semi-definite state weighting matrix and $R_C$ is a symmetric and positive definite control weighting matrix. Examples of the matrices $Q_C$ and $R_C$ will be given in the remainder of the description.

A new quadratic criterion, denoted $J_2$, is defined from the quadratic criterion $J_1$ by performing a first-order truncated expansion of the state vector x and of the variable $u_f$ about a value $\bar{\theta}$, assuming that the parameter vector $\theta$ undergoes sufficiently small variations about this value $\bar{\theta}$. The value $\bar{\theta}$ is the nominal value of $\theta$ and is equal to the mathematical expectation of $\theta$, that is to say $\bar{\theta} = E(\theta)$.

The result of this classical first-order truncated expansion calculation is expressed as follows:

$$J_2 = \lim_{T \to \infty} \frac{1}{T} \int_0^T E[\bar{x}^T Q_c \bar{x} + \bar{u}_f^T R_c \bar{u}_f +$$

$$(\nabla_s \bar{x})^T (\Sigma_a \otimes Q_c)(\nabla_s \bar{x}) + (\nabla_s \bar{u}_f)^T (\Sigma_s \otimes R_c)(\nabla_s \bar{u}_f)] dt$$

with:

$$x(t,\bar{\theta}) = \bar{x};\ u_f(t,\bar{\theta}) = \bar{u}_f;\ \nabla_s \bar{x} = \begin{bmatrix} \frac{\partial x(t,\bar{\theta})}{\partial \theta_1} \\ \vdots \\ \frac{\partial x(t,\bar{\theta})}{\partial \theta_4} \end{bmatrix}$$

$$\nabla_s \bar{u}_f = \begin{bmatrix} \frac{\partial u_f(t,\bar{\theta})}{\partial \theta_1} \\ \vdots \\ \frac{\partial u_f(t,\bar{\theta})}{\partial \theta_4} \end{bmatrix}$$

in which $\otimes$ represents the Kronecker product and $\Sigma_\theta$ is the covariance matrix of $\bar{\theta}$, where $\bar{\theta}=\theta-\bar{\theta}$ (i.e. $\Sigma_\theta = E(\bar{\theta}\bar{\theta}^T)$).

In this expression, the first and second terms respectively represent the energies corresponding to the state vector x and to the variable $u_f$, the derivative of the control variable u, whereas the third and fourth terms which depend upon the partial derivatives of the state vector x and of the variable $u_f$ with respect to the parameters P, $V_S$, Q, X of the system respectively represent the energies of the sensitivities of the state vector x and of the variable $u_f$ with respect to small variations of the system parameters P, $V_S$, Q, X grouped into the vector $\theta=(P, V_S, Q, X)$.

Minimization of the quadratic criterion $J_2$ therefore leads to minimizing the sum of these four energies. The last two terms, which are not found in classical quadratic criteria, provide for an effect of desensitizing the regulated system with regard to variations of the vector $\theta$ grouping together the parameters P, $V_S$, Q and X.

The minimization of the criterion $J_2$ cannot be done directly, and the gains $K_\Omega$, $K_V$, $K_P$, $K_I$ are obtained by an iterative procedure.

To do this, gains denoted $K_i = (K_\Omega, K_V, K_P, K_X)$, are defined at each step i, these defining a regulator of which a state representation is expressed in a classical manner in the following form:

$$\dot{\xi} = \Phi_i \xi + \Gamma_i y \qquad (4)$$

$$u_f = -G_i \xi - H_i Y$$

A new higher-order so-called "augmented" linear system (5) is constructed from this state representation (4) and from the linear model (3), and is expressed in the following form:

$$\dot{X}_a = A_a X_a + B_a u_f \qquad (5)$$

$$y(t) = C_a X_a$$

with:

$$A_a = \begin{bmatrix} A & 0 & 0 \\ A_a & I_d \otimes (A-BH_i) & I_d \otimes (-BG_i) \\ 0 & I_d \otimes \Gamma_i & I_d \otimes \Phi_i \end{bmatrix};$$

$$B_a = \begin{bmatrix} B \\ B_a \\ 0 \end{bmatrix}; C_a = [I\ 0\ 0];$$

$$A_a = \begin{bmatrix} \frac{\partial A}{\partial \theta_1} \\ \vdots \\ \frac{\partial A}{\partial \theta_4} \end{bmatrix}; B_a = \begin{bmatrix} \frac{\partial B}{\partial \theta_1} \\ \vdots \\ \frac{\partial B}{\partial \theta_4} \end{bmatrix}; X_a = \begin{bmatrix} x \\ \sigma \\ \mu \end{bmatrix};$$

$$\sigma = \begin{bmatrix} \frac{\partial x}{\partial \theta_1} \\ \vdots \\ \frac{\partial x}{\partial \theta_4} \end{bmatrix}; \bar{\mu} = \begin{bmatrix} \frac{\partial \xi}{\partial \theta_1} \\ \vdots \\ \frac{\partial \xi}{\partial \theta_1} \end{bmatrix}$$

In this expression, the variables and their partial derivatives are evaluated at $\theta=\bar{\theta}$.

An associated criterion $J_{3i}$, obtained by classical application of linear quadratic Gaussian control to the system modelled in (5), is defined on the basis of this new linear modelling (5) and by assuming that the gains $K_i$ are known.

The associated criterion $J_{3i}$ is expressed in the form:

$$J_{ji} = \lim_{T \to \infty} \frac{1}{T} \int_0^T E[X_a^T V X_a + u_f^T R_c u_f] dt$$

with:

$$V = \begin{bmatrix} Q_c & 0 & 0 \\ 0 & (\Sigma_d \otimes Q_c) + (I_d \otimes H_i)^T(\Sigma_d \otimes R_c)(I_d \otimes H_i) & (I_d \otimes H_i)^T(\Sigma_d \otimes R_c)(I_d \otimes G_i) \\ 0 & (I_d \otimes G_i)^T(\Sigma_d \otimes R_c)(I_d \otimes H_i) & (I_d \otimes G_i)^T(\Sigma_d \otimes R_c)(I_d \otimes G_i) \end{bmatrix}$$

Minimization of the criterion $J_{3i}$ provides the gains $K_{i+1}$ of the next step i+1.

In order to initialize the iterative procedure, the initial gains $K_0$ are determined in a simple manner. Indeed, as was seen earlier, the state variables $\Omega$, $V_S$, P of the system are fully measurable, and the gains $K_0$ are thus obtained by state feedback to the linear model (3).

As seen earlier, the control law is such that the variable $u_f$ is expressed linearly as a function of the coefficients of the vector x. Consequently, in the modelling (4) associated with this regulator, the terms $\Phi$, $\Gamma$ and G are zero. Thus, at the first iteration, the state $X_a$ of the augmented system (5) consists solely of x and $\sigma$. the corresponding quadratic criterion to be minimized $J_{30}$ involves these two quantities and the variable $u_f$.

The iterative procedure for obtaining the gains $K_i$ is represented in FIG. 1. Starting from the nominal system corresponding to the augmented linear model (3) established in step 10, the initial gains denoted $K_0$ are determined in step 12, as has just been explained, by applying a linear quadratic control to the augmented linear model (3) and minimizing the associated quadratic criterion.

To calculate the succeeding gains $K_{i+1}$, a state representation (4) of the regulating device, assumed to be known, associated with the gains $K_i$ is determined in step 14, and then an augmented model (5) is determined in step 16, on the basis of which a quadratic criterion $J_{3i}$ is minimized in a classical manner using the theory of linear quadratic Gaussian control, hence making it possible to obtain the gains $K_{i+1}$.

In order to preclude the order of the state representation (4) of the regulating device from increasing during repeated implementation of the iterative steps, the order of the state representation associated with the regulating device with parameters $K_{i+1}$ is reduced at each iteration in step 18 by the method of balanced feasibility described earlier.

After this step, a convergence criterion determines, in step 20, whether or not it is necessary to further refine the determination of the gains $K_{i+1}$. If such is the case, a new iteration of the iterative procedure is implemented in step 22.

By way of illustration, with regard to alternators of the 1300 MW type, in view of the reduction in the order of the state representation of the regulating device at each step, a regulating device of order two is obtained at the end of the iterative procedure. A plot of the Bode loci of the transfers between the state variables and the control variable shows that it is possible to further reduce the order of the regulating device and in particular to decrease it to zero by taking the respective mean of each of the gains obtained during the iterative procedure as regulating parameter $K_\Omega$, $K_V$, $K_P$, $K_I$, these parameters being regarded as functions of frequency.

FIG. 2 represents a block diagram of the regulating of an alternator by a regulating device according to the invention, and hence depicts an alternator 50 associated with an excitation device 50A. The state variables $\Omega$, $V_S$, P are measured at the output of the alternator 50 by suitable conventional sensors (not represented).

To each of these measured values there corresponds a feedback loop denoted 52, 54 and 56 respectively, each equipped with an amplifier 58, 60 and 62 whose gain corresponds to the gains $K_\Omega$, $K_V$, $K_P$ corresponding to each of the state variables $\Omega$, $V_S$, P respectively.

It will be noted that the mechanical power $P_m$ is regarded as a disturbing input which is not taken into account when designing the regulating device. However, so as to reduce the effect of a variation in the mechanical power $P_m$ on the stator voltage $V_S$, the power P in the regulating device represented in FIG. 2 is decreased at 64 by the mechanical power $P_m$ measured on the alternator drive turbine.

Furthermore, the regulator is designed while disregarding the excitation device 50A which, in reality, is interposed between the output of the regulator and the input of the alternator 50. As is represented in FIG. 2, a device 50B for compensating the exciter is arranged if necessary between the output of the regulator and the input of the excitation device 50A.

An additional feedback loop 66 conveys the value of the stator voltage $V_s$ to a subtraction device 68 which calculates the difference of this value and of the setpoint value $V_C$. The result of this difference is next fed into an integrator 70 before being multiplied by an amplifier 72 whose gain corresponds to the gain $K_Z$ calculated as explained earlier.

The control variable u is then formed from the outputs from the various amplifiers by means of summation and subtraction devices 74 to 80 following a conventional layout which makes it possible to implement the control law defined above and results from integration of the expression for $u_I$. The variable u is then sent to the alternator 50 via a device for compensating the exciter 50B and an excitation device 50A.

In practice, although such a regulator can be made from analog devices, use will preferably be made of a digital computer, for example a computer programmed to generate the control variable u as a function of the state variables $\Omega$, $V_S$, P measured at the output of the alternator 50 as well as of the setpoint $V_C$.

In the specific case of an alternator, the stator voltage $V_S$ and the line length X are those of the four parameters P, $V_S$, Q, X of the alternator, defined above and used in the modelling, which most influence the stability of the system. Indeed, it is difficult to stabilize an alternator connected to a network when the line length X is large or again when the stator voltage $V_S$ is low. On the other hand, the variations in active power P and reactive power Q have a less significant influence on stability. These various considerations allow the design of a regulating device which is desensitized solely with respect to the line length X and the stator voltage $V_S$.

Thus, the vector θ is reduced to two components for the calculations.

As regards the choice of weighting matrices $Q_C$ and $R_c$, the matrix $Q_C$ being positive semi-definite, it is often chosen to be diagonal, these diagonal coefficients being denoted $q_{ii}$ for i∈{1,2,3,4}.

It is known that when designing a device for regulation by linear quadratic control, a systematic start must be made by weighting the variable to be regulated (in this case, the stator voltage $V_S$) as well as the integral of the setpoint error e. The other state variables (here $\Omega$ and P) have merely a stabilizing role and would only be weighted for the purposes of improving the stability margins.

In the present case, the variable to be regulated is the stator voltage $V_S$. It is therefore necessary to limit the variations in this quantity and bring it near to its setpoint value $V_C$ as quickly as possible. Heavy weighting of the stator voltage $V_S$ through the coefficient $q_{22}$ induces a large gain in the voltage, and hence limits these variations. The weighting coefficient $q_{44}$ for the integral of the error e between the setpoint value $V_C$ and the stator voltage $V_S$ influences the quickness with which the setpoint value $V_C$ is overhauled. Thus, the larger the value $q_{44}$, the quicker the stator voltage $V_S$ regains the setpoint value $V_C$.

Furthermore, the electrical power P and the speed Q have a stabilizing role. Moreover, it is observed that if the gains in the speed $\Omega$ and the active power P are too big, a variation in the frequency of the network, which greatly influences these two quantities, then impacts on the stator voltage $V_S$ to be regulated. One way of limiting the influence of this disturbance on the stator voltage $V_S$ is therefore to reduce the gains in the speed $\Omega$ and the electrical power P. Thus, the weighting coefficients $q_{11}$ and $q_{33}$ are taken equal to zero.

Regarding the weighting matrix $R_C$, the latter is taken equal to a positive rear number. Its value is chosen such as to obtain, over the whole of the operating domain, a margin of delay sufficient to guarantee robustness with regard to the dynamics which were disregarded when linearizing the model of the alternator. Thus, the larger than number chosen for the matrix $R_C$, the greater the margin of delay.

When choosing the various parameters, account has to be taken of the fact that the performance obtained depends on the coefficients of the matrix $Q_C$, whereas the no-parametric robustness depends on the choice of the matrix $R_C$ and the parametric robustness depends on the choice of the matrix $\Sigma_\theta$ and increases with the latter.

Owing to the existence of a compromise between robustness and performance, the coefficients of these matrices are not determined independently of one another but with the aim of producing the best possible compromise.

We claim:

1. Device for regulating the stator voltage (variable to be regulated $V_S$) of an alternator (50) coupled to an electrical network, this device resulting from a linear approximation of the alternator coupled to the electrical network around a nominal operating point defined by several operating parameters (P, $V_S$, Q, X) of the alternator and including several feedback loops (52, 54, 56, 66) associated with respective gains ($K_\Omega$, $K_V$, $K_P$, $K_I$) acting on several state variables ($\Omega$, $V_S$, P) measured at the output of the alternator as well as on the integral of a setpoint error (e) defined by the difference between the stator voltage ($V_S$) and a setpoint value ($V_C$), in order to define, on the basis of the setpoint value ($V_C$), a control variable (u) for the alternator, which is applied to the input of the latter to maintain the value of the stator voltage ($V_S$) close to the setpoint value ($V_C$), characterized in that the gains ($K_\Omega$, $K_V$, $K_P$, $K_I$) of the device are obtained by minimizing the mathematical expectation of a quadratic criterion ($J_2$) dependent upon a state vector (x) embracing the derivatives with respect to time of the state variables ($\Omega$, $V_S$, P) of the alternator and the setpoint error (e) and upon the derivative ($u_f$) with respect to time of the control variable (u), these variables being respectively the state and the input of a linear model (3), termed the augmented system, whose state matrix (A($\theta$)) and input matrix (B($\theta$)) depend on several of the parameters (P, $V_S$, $\Omega$, X) of the alternator, and in that the gains ($K_\Omega$, $K_V$, $K_P$, $K_I$) are determined so as furthermore to minimize the sensitivities of the state vector (x) and of the derivative with respect to time of the control variable (u) relative to small variations in at least one of the said several parameters (P, $V_S$, Q, X) of the alternator, around the nominal operating point thus creating a desensitization of the regulated alternator with regard to the said several parameters (P, $V_S$, Q, X).

2. Regulating device according to claim 1, characterized in that the said quadratic criterion ($J_2$) is dependent upon the partial derivatives of the state vector (x) and upon the derivative with respect to time of the control variable (u) with respect to the parameters (P, $V_S$, Q, X) of the alternator, and in that the desensitization of the regulated alternator is carried out by minimization of the said quadratic criterion ($J_2$).

3. Regulating device according to claim 1, characterized in that the linear model (1) giving rise to the state variables ($\Omega$, $V_S$, P) used in the state vector (x) is a model reduced to a lower order of a complete linear model (0) by a method of balanced feasibility consisting in minimizing a norm of the difference between the transfer matrix of the complete model and that of the reduced model.

4. Regulating device according to claim 1, characterized in that the gains ($K_\Omega$, $K_V$, $K_P$, $K_I$) are determined by an iterative method consisting in carrying out at each step a synthesis of the gains (($K_\Omega$, $K_V$, $K_P$, $K_I$)$_{i+1}$) by a method of linear quadratic Gaussian control, consisting in minimizing a quadratic criterion ($J_{3i}$), applied to an augmented model (5) dependent upon a state representation (4) of the regulating device obtained with the gains (($K_\Omega$, $K_V$, $K_P$, $K_I$)$_i$) calculated in the previous step and upon the linear modelling (3) of the augmented system.

5. Regulating device according to claim 4, characterized in that each step of synthesizing the gains ($K_\Omega$, $K_V$, $K_P$, $K_I$) is followed by a reduction to a lower order of the state representation (4) associated with these gains by a method of balanced feasibility.

6. Regulating device according to claim 1, characterized in that the state variables are the angular speed ($\Omega$), the stator voltage ($V_S$) and the electrical power (P).

* * * * *